(12) United States Patent
Aarskog

(10) Patent No.: US 10,395,826 B2
(45) Date of Patent: Aug. 27, 2019

(54) METHOD OF SUPPORTING A CAPACITOR, CAPACITOR ASSEMBLY AND SUBSEA ADJUSTABLE SPEED DRIVE COMPRISING THE ASSEMBLY

(71) Applicant: Siemens Aktiengesellschaft, Munich (DE)

(72) Inventor: Fredrik Gundersen Aarskog, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 565 days.

(21) Appl. No.: 15/027,483

(22) PCT Filed: Nov. 10, 2014

(86) PCT No.: PCT/EP2014/074139
§ 371 (c)(1),
(2) Date: Apr. 6, 2016

(87) PCT Pub. No.: WO2015/090728
PCT Pub. Date: Jun. 25, 2015

(65) Prior Publication Data
US 2016/0247631 A1    Aug. 25, 2016

(30) Foreign Application Priority Data
Dec. 16, 2013  (EP) .................................... 13197485

(51) Int. Cl.
*H01G 2/10* (2006.01)
*H01G 4/224* (2006.01)
(Continued)

(52) U.S. Cl.
CPC ................ *H01G 4/015* (2013.01); *H01G 2/10* (2013.01); *H01G 4/224* (2013.01); *H02M 7/42* (2013.01)

(58) Field of Classification Search
CPC ............................... H01G 4/015; H01G 4/224
See application file for complete search history.

(56) References Cited

U.S. PATENT DOCUMENTS

2008/0171259 A1    7/2008  Kanai et al.
2010/0139544 A1    6/2010  Bo
(Continued)

FOREIGN PATENT DOCUMENTS

CN          2278988 Y    4/1998
CN          1981438 A    5/2007
(Continued)

OTHER PUBLICATIONS

Extended European Search Report dated Jun. 6, 2014.
(Continued)

*Primary Examiner* — Eric W Thomas
(74) *Attorney, Agent, or Firm* — Harness, Dickey & Pierce, P.L.C.

(57) ABSTRACT

A method is disclosed for supporting a capacitor. In an embodiment, the method includes applying a pressure on a first side of the capacitor parallel to a first electrode of the capacitor in a first direction of a normal of the first electrode; applying a pressure on a second side of the capacitor parallel to a second electrode of the capacitor in a second direction of a normal of the second electrode, the first direction being opposite to the second direction; and afterwards pressurizing a non-conductive fluid surrounding the capacitor to a target pressure.

29 Claims, 4 Drawing Sheets

(51) Int. Cl.
*H01G 4/015* (2006.01)
*B63G 8/00* (2006.01)
*H02M 7/42* (2006.01)

(56) References Cited

U.S. PATENT DOCUMENTS

| | | |
|---|---|---|
| 2011/0164344 A1 | 7/2011 | Bo et al. |
| 2012/0010318 A1* | 1/2012 | Tan .................. H01G 4/18 |
| | | 522/113 |
| 2015/0292304 A1 | 10/2015 | Sneisen |

FOREIGN PATENT DOCUMENTS

| | | |
|---|---|---|
| EP | 2487327 A1 | 8/2012 |
| EP | 2579438 A1 | 4/2013 |
| GB | 567165 A | 1/1945 |
| JP | H1197318 A | 4/1999 |
| WO | WO-2008055515 A1 | 5/2008 |
| WO | WO 2009086844 A1 | 7/2009 |
| WO | WO-2009086844 A1 | 7/2009 |
| WO | WO 2012042835 | 4/2012 |

OTHER PUBLICATIONS

International Search Report PCT/ISA/210 for International Application No. PCT/EP2014/074139 dated Mar. 6, 2015.
Written Opinion of the International Searching Authority PCT/ISA/237 for International Application No. PCT/EP2014/074139 dated Mar. 6, 2015.
Chinese Office Action and English translation thereof dated Jul. 28, 2017.
European Office Action dated Mar. 28, 2019.

* cited by examiner

US 10,395,826 B2

METHOD OF SUPPORTING A CAPACITOR, CAPACITOR ASSEMBLY AND SUBSEA ADJUSTABLE SPEED DRIVE COMPRISING THE ASSEMBLY

PRIORITY STATEMENT

This application is the national phase under 35 U.S.C. § 371 of PCT International Application No. PCT/EP2014/074139 which has an International filing date of Nov. 10, 2014, which designated the United States of America and which claims priority to European patent application number EP 13197485.9 filed Dec. 16, 2013, the entire contents of which are hereby incorporated herein by reference.

FIELD

At least one embodiment of the present invention generally relates to a method and/or to an arrangement for supporting a capacitor, in particular a film capacitor, wherein the capacitor in particular is to be used in a subsea application. At least one embodiment further generally relates to a capacitor assembly.

BACKGROUND

Self-healing film capacitors may be used as components of subsea power grids, in particular a power cell DC-link capacitor, in order to minimize space and maximize lifetime and reliability. Self-healing film capacitors may also be used as energy storage devices in DC power supplies.

Document GB 567,165 discloses improvements in or relating to electrical condensers, wherein a stack of interleaving con-ducting and insulating layers is held in a clamp comprising rigid clamping plates at the ends of the stack within a frame of laminated paper. The assembled stack in its frame can be mounted in a container filled with insulating oil or other insulating fluid.

Document EP 2 487 327 A1 discloses a subsea electronic system comprising a watertight enclosure and power electronics, for example an inverter, a variable speed drive (VSD) or the like.

SUMMARY

The inventors have noted that self-healing film capacitors used in a subsea application do not work properly in all situations and conditions; in particular the self-healing mechanism does not work. Thus, the inventors have recognized that there may be a need for a method and an arrangement for supporting a capacitor, in particular a film capacitor, so that it may be ensured that the capacitor is working properly in particular in subsea applications, i.e. under high ambient pressure.

Advantageous embodiments of the present invention are described by the claims.

According to an embodiment of the present invention, it is provided a method for supporting a capacitor, the method comprising applying a pressure on a first side of the capacitor parallel to a first electrode of the capacitor in a first direction of a normal of the first electrode; applying a pressure on a second side of the capacitor parallel to a second electrode of the capacitor in a second direction of a normal of the second electrode, wherein the first direction is opposite to the second direction; and afterwards pressurizing a non-conductive fluid surrounding the capacitor to a target pressure in particular being greater than an atmospheric air pressure.

According to an embodiment of the present invention, it is provided an arrangement for supporting a capacitor, the arrangement comprising a vessel, a frame arrangeable in the vessel and adapted to apply a pressure on a first side of the capacitor parallel to a first electrode of the capacitor in a first direction of a normal of the first electrode and to apply a pressure on a second side of the capacitor parallel to a second electrode of the capacitor in a second direction of a normal of the second electrode, wherein the first direction is opposite to the second direction and a pressurizing system adapted to pressurize a non-conductive fluid surrounding the capacitor within the vessel to a target pressure being above an atmospheric air pressure. The vessel may be cylindrically shaped, in particular comprising metal walls. The frame may comprise several components such as bars, plates, screws and springs in order to hold or support the capacitor.

In particular, the frame may comprise at least two parallel stiff plates (having a plane surface) between which the capacitor may be placed and which stiff plates may apply the pressure on the first side and the second side, respectively. The pressurizing system may comprise one or more compressors in communication with the non-conductive fluid (a fluid that is electrically insulating, in particular dielectric fluid). Thereby, the pressurizing system may be located outside the vessel. The frame for supporting the capacitor may hold or support the capacitor the whole lifetime of the capacitor. I.e., after manufacturing the capacitor and supporting the capacitor according to embodiments of the present invention (in particular using the frame), the capacitor may not be released from the frame anymore for its whole lifetime.

A further embodiment of the invention provides a capacitor assembly comprising a capacitor and a frame, wherein the frame is adapted to apply a pressure on a first side of the capacitor parallel to a first electrode of the capacitor in a first direction of a normal of the first electrode and to apply a pressure on a second side of the capacitor parallel to a second electrode of the capacitor in a second direction of a normal of the second electrode, wherein the first direction is opposite to the second direction. The frame may be configured in accordance with any of the embodiments described above or hereinafter. Furthermore, the capacitor may be supported in accordance with the above disclosed method in any of the described embodiments. The capacitor can furthermore be configured in accordance with any of the configurations described herein. Different physical means (e.g. spring(s), screw(s), bolt(s), bar(s), plate(s), motor) can be provided to configure the frame such that it is adapted to apply a pressure on the sides of the capacitor. In an embodiment, the frame of the capacitor assembly may comprise a first plate for applying the pressure to the first side of the capacitor and a second plate for applying the pressure to the second side of the capacitor, wherein the first plate and the second plate are connected by a guide element, in particular guide rods. One of the first and second plates may be a movable plate which is movable along the guide element, wherein the frame may further comprise a spring element applying a spring force to the first or second plate to urge the first and second plates together. The spring element may in particular apply a force to the movable plate. The spring may at its other side be mechanically connected to the guide element so as to apply the spring force to the guide element, either directly or indirectly, e.g. via a further plate. The spring element may for example push the movable plate and the further plate apart, the further plate being fixed to the guide element, or the spring element may directly be supported against the guide element (e.g. to a nut fastened thereto), thus pushing the movable plate away from its support at the guide element.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document. A further embodiment of the invention provides a subsea adjustable speed drive comprising a frequency converter having a direct current (DC) link, and further comprising a vessel enclosed capacitor assembly according to any of the above described embodiments, the capacitor of the vessel enclosed capacitor assembly being coupled to the direct current link of the frequency converter.

DETAILED DESCRIPTION OF THE EXAMPLE EMBODIMENTS

Figure 1:
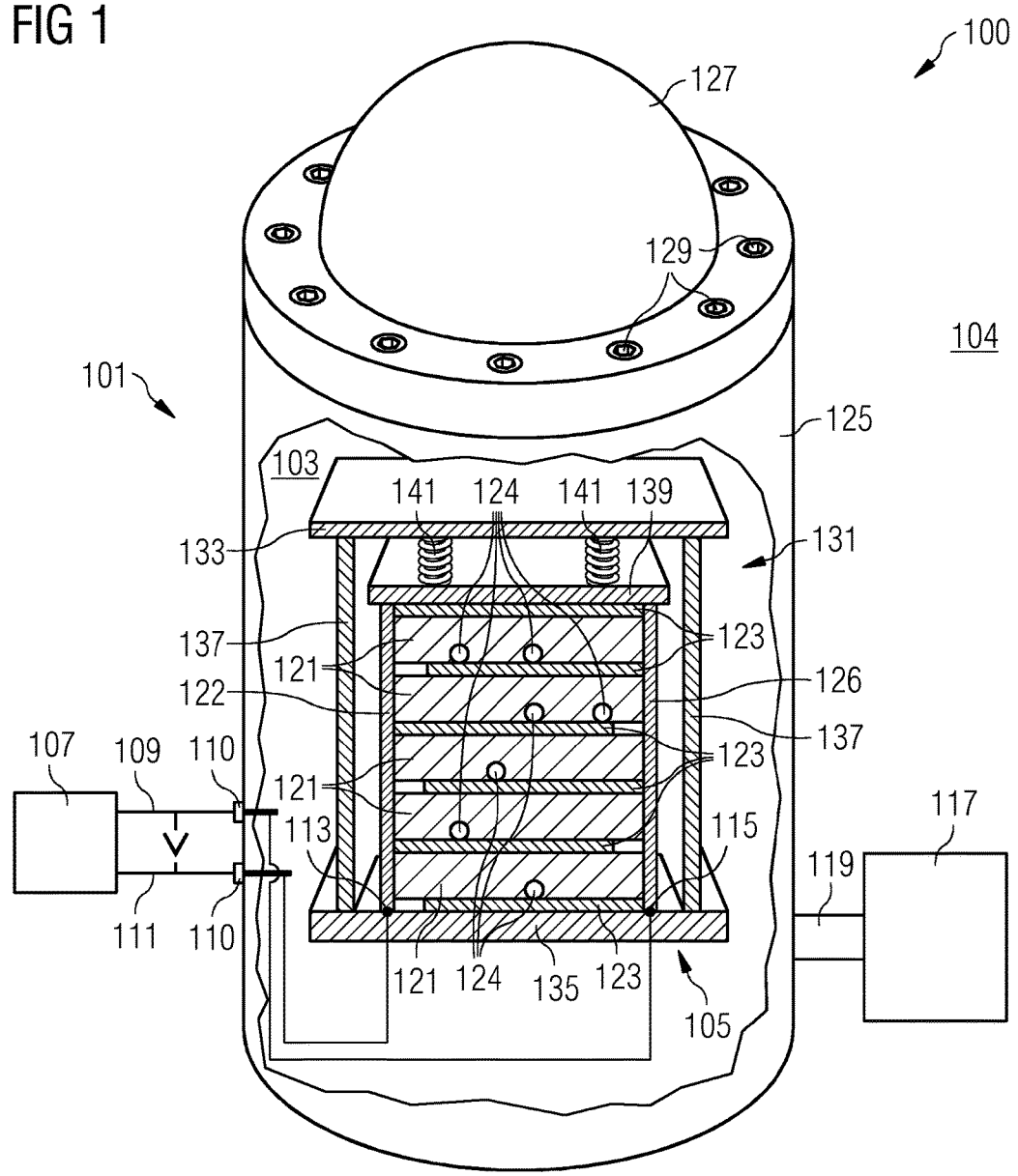
FIG. 1 schematically illustrates an arrangement for treating a capacitor for healing faults according to an embodiment of the present invention being adapted for carrying out a method for treating a capacitor for healing faults according to an embodiment of the present invention.

According to an embodiment of the present invention, it is provided a method for supporting a capacitor, the method comprising applying a pressure on a first side of the capacitor parallel to a first electrode of the capacitor in a first direction of a normal of the first electrode; applying a pressure on a second side of the capacitor parallel to a second electrode of the capacitor in a second direction of a normal of the second electrode, wherein the first direction is opposite to the second direction; and afterwards pressurizing a non-conductive fluid surrounding the capacitor to a target pressure in particular being greater than an atmospheric air pressure.

The method for supporting the capacitor may hold the capacitor by contacting and acting on or applying force on at least two portions or sides of the capacitor, in order to ensure that the capacitor maintains its integrity and/or its internal structure and/or its self-healing properties, in particular such that the capacitor maintains the positioning and shape of its constituting portions, such as dielectric film, metal layer or metal coverage and relative orientation and positioning of adjacent layers which may have a stacked configuration. The pressure applied on the first side of the capacitor may be generated by a force which may then be distributed across the first side of the capacitor by a solid or rigid element, such as a plane plate, which may in particular extend across an entire surface of the first side. The first side may be an outer surface or may comprise an outer surface of the capacitor extending in a main surface of a layer of the capacitor the layer comprising a dielectric material being covered or provided with a conductive material, e.g. metal layer. Also the pressure applied on the second side may be generated by a force which may then be distributed across a large area (lateral area) using a stiff element, such as a plane plate.

When pressure is applied on the first side of the capacitor and the second side of the capacitor, no or only little pressure may be applied on other sides of the capacitor. Thus, other sides of the capacitor may either be surrounded by air at atmospheric conditions or may be surrounded (already) by the non-conductive fluid which may however be not pressurized but may be in communication with an atmospheric air pressure. Thus, the pressure on the first side and the pressure on the second side are directed pressures (in particular generated by a spring force) which are different from a hydrostatic pressure which would act in all directions.

When the pressure is applied on the first side of the capacitor and the second side of the capacitor, adjacent layers of the capacitor (comprising dielectric material and metal layers stacked above each other in an alternating manner) may be pressed together and it may be reduced or even prevented that the non-conductive fluid may penetrate in between layers so that the non-conductive fluid is actually excluded from an interior of the capacitor. Thereby, the relative arrangement, positioning and orientation of the multiple layers of dielectric material covered or deposited with metal may be maintained regarding their proper assemblage and construction. Thus, since the structural integrity of the capacitor is ensured to be maintained, its operational function may be ensured to be maintained as well. The integrity may even be maintained when the non-conductive fluid surrounding the capacitor is pressurized to a target pressure, after the pressure has been applied (and is maintained to be applied) on the first side and the pressure has been applied (and is maintained to be applied) on the second side of the capacitor.

In a typical subsea application, a capacitor may be contained within a vessel or enclosure in which a pressure prevails which equals or is close to the pressure outside of the vessel in the sea (i.e. in a pressure compensated enclosure). Thereby, in a subsea application in which the method for supporting the capacitor according to this embodiment of the present invention is applied, the capacitor may be exposed to a target pressure of the non-conductive fluid. The target pressure may for example be substantially equal to the ambient pressure prevailing at the subsea location at which the enclosure comprising the capacitor is to be installed. In other embodiments, the target pressure may be a pressure prevailing inside a pressure vessel, in particular a pressure test vessel, for example during pressure testing of the capacitor or during the performance of a self-healing method as described further below. Nevertheless, the structural and functional integrity of the capacitor may be ensured or maintained.

In some applications, capacitors may be mounted freely without applying a defined pressure on a first side or applying a defined opposing pressure on a second side of the capacitor. The inventor has performed tests on such freely mounted capacitors to monitor effects when such freely mounted capacitors are pressurized in dielectric fluid and when they are then depressurized. Those conventionally mounted capacitors delaminated or showed wrinkle (s) in the surface of the capacitor dielectric layers (failures and wrinkling occur even if the capacitor is not depressurized afterwards). These effects caused the capacitor self-healing functionality to fail catastrophically, which in turn caused the capacitor to short circuit permanently. The delamination and wrinkling may get worse the higher the pressure of the surrounding medium is. The delamination also gets worse with increasing fluid temperature.

According to embodiments of the present invention however, delamination and generation of wrinkles of dielectric layers of capacitors are reduced or even avoided when the capacitors are pressurized (and afterwards depressurized or not depressurized). Thus, by embodiments of the present invention, delamination and wrinkling of dielectric film of film capacitors is reduced or even prevented, such that the self-healing mechanism is maintained. By the mounting method or supporting method of the at least one embodiment of the present invention, structural and functional integrity of film capacitors may be ensured and maintained, in particular in subsea applications.

In an embodiment, the pressure may be applied with an even distribution across the first and/or second side of the capacitor. Wrinkling of layers in some areas may thus be avoided and a successful self-healing treatment may be ensured.

According to an embodiment of the present invention, the target pressure of the non-conductive fluid is above an atmospheric air pressure at the surface of the earth, e.g. between 10 bar and 500 bar, in particular between 50 bar and 500 bar, further in particular between 100 bar and 350 bar. The target pressure may correspond to a hydrostatic pressure in the sea at a depth of between 100 and 5000 m, in particular between 500 and 5000 m, further in particular between 1000 m and 3500 m. Thereby, the method may satisfy requirements of typical subsea applications.

According to an embodiment of the present invention, the temperature, in particular of the non-conductive fluid, is between −20° C. and 100° C., in particular between 30° C. and 90° C. Such temperatures may prevail in typical subsea applications or may prevail under the worst conditions, since the viscosity of the non-conductive fluid may decrease with increasing temperature increasing the risk of penetrating between layers or dielectric layers of the capacitor. However, by applying the pressure on the first side and the second side, expansion of the fluid into an interior of the capacitor may be reduced or even avoided.

According to an embodiment of the present invention, the capacitor is a film capacitor comprising a stack of dielectric layers formed from at least two films which are each coated or deposited with a conductor (metal), the films in particular having a thickness between 1 μm and 20 μm, the films in particular comprising propylene, wherein on each film a metal, in particular comprising aluminum, is (vacuum) deposited on one side to be used as at least one of the electrodes. The film capacitor may comprise an insulating plastic film as the dielectric material and the electrode of the film capacitor may be metalized aluminum or zinc (or other metal or alloy) applied directly to the surface of the plastic film. Two of these conductive layers may be wound into a cylinder-shaped winding, may be flattened to reduce mounting space requirements or layered as multiple single layers stacked together to form a capacitor body.

In particular, the film capacitor may be made out of two pieces of plastic film (dielectric material) covered with metallic electrodes, wound in-to a cylindrically shaped winding, with terminals attached and then encapsulated. The film material as the dielectric layer may be selected for desirable electrical characteristics, such as stability, wide temperature range, or ability to withstand very high voltages. Polypropylene film capacitors may be used because of their low electrical losses and their nearly linear behavior over a wide frequency range. Thus, conventionally available capacitors may be supported by the method according to an embodiment of the present invention.

According to an embodiment of the present invention, the pressure applied on the first side and/or the pressure applied on the second side is selected, in particular in dependence of physical properties of the dielectric layers, e.g. thickness, such that no non-conductive fluid penetrates between dielectric layers of the capacitor or causes wrinkles or delamination in the dielectric layers of the capacitor when the non-conductive fluid surrounding the capacitor is pressurized to the target pressure. A threshold pressure can be determined e.g. experimentally by monitoring potential penetration of the non-conductive fluid and generation of wrinkles or delamination in the dielectric layers while increasing the pressure of the non-conductive fluid. Thereby, the functional integrity of the capacitor may be maintained when the non-conductive fluid is pressurized to the target pressure, but also when the non-conductive fluid is depressurized (for example after manufacturing the capacitor and healing the capacitor).

Additionally or alternatively, according to an embodiment of the present invention, the pressure applied on the first side and/or the pressure applied on the second side is selected such that that the pressure from the ambient static fluid pressure combined with the pressure from the method of supporting the capacitor does not exceed a critical total pressure to maintain a self-healing function. The self-healing function may be determined to be maintained, if it is e.g. experimentally determined that a short circuit current (during applied voltage at the capacitor terminals) is below a threshold, during which the capacitor is not destroyed.

According to an embodiment of the present invention, the pressure applied on the first side and/or the pressure applied on the second side of the capacitor is between 0.1 bar and 50 bar, in particular between 1 bar and 10 bar.

Thus, relative to the target pressure, the pressure (directed pressure) applied on the first side and the second side in opposite directions is relatively low such that in particular a healing process may not or only to a small extent be affected by the directed pressure applied to the first side and the second side.

Thus, a self-healing process of the capacitor may be per-formed to improve the capacitor and in particular reduce faults and/or defects in the capacitor.

In an embodiment, the pressure applied to the first side of the capacitor is selected such that the sum of the pressure applied to the first side and the target pressure do not exceed a pressure threshold. The pressure threshold may lie within the range of about 100 bar to about 600 bar. The pressure threshold may be selected in dependence on the capacitor design, such as dielectric film material/thickness and metallization material/thickness. This way, it may be ensured that the self-healing process can be performed efficiently.

According to an embodiment of the present invention, the non-conductive fluid comprises a dielectric fluid. The fluid may be a liquid, in particular a dielectric liquid, e.g. Castrol Brayco Micronic SBF and/or Envirotemp 200 Fluid and/or 3M Fluorinert and/or 3M Novec and/or an ester-based dielectric fluid or liquid, further in particular MIDEL 7131.

According to an embodiment of the present invention, the method may be extended to comprise a healing step. In particular, before pressurizing the non-conductive fluid surrounding the capacitor to the target pressure (i.e. when a pressure is already applied on the first side and a pressure is applied on the second side of the capacitor), the method may further comprise before pressurizing the non-conductive fluid surrounding the capacitor to the target pressure: applying a voltage between two electrodes of the capacitor to charge the capacitor at a start pressure of the non-conductive fluid and afterwards pressurizing the non-conductive fluid surrounding the capacitor to the target pressure while the voltage is applied. Thus, the voltage is applied while the non-conductive fluid has a relatively low pressure, i.e. the start pressure.

Thereby, a healing occurs at the start pressure, in order to remove or reduce defects in the capacitor which show up al-ready at this start pressure. Afterwards, the pressure of the non-conductive fluid surrounding the capacitor is gradually increased and more and more defects show up which however are being healed continuously so that not all defects occur at the same time (which could make the healing process impossible) but subsequently.

Furthermore, the pressure on the first side and the pressure on the second side are maintained to be applied so that structural and functional integrity of the capacitor may be maintained and ensured.

According to an embodiment of the present invention, during the pressurizing the pressure of the non-conductive fluid increases at a rate of between 1 and 10,000 bar per minute, further in particular between 50 and 1,000 bar per minute, still further in particular around 100 bar per minute.

It has been found by the inventor that pressurizing at this pressure increase rate allows the healing processes to be performed, since the healing processes (at a particular pressure) are relatively fast.

According to an embodiment of the present invention, the voltage has a value between 0.5 and 1.5 of a rated voltage of the capacitor, in particular between 300 V and 1,500 V, wherein further in particular after applying the voltage an electric field between the two electrodes has a value between 20 and 500 v/μm, in particular between 100 and 200 v/μm. Application of such a voltage may result in small short-circuits in regions of the capacitor where defects are present. Thereby, these defects may be burned out, i.e. removed, in order to heal the capacitor.

According to an embodiment of the present invention, the method further comprising after pressurizing: depressurizing the non-conductive fluid to the start pressure, transporting the capacitor to an application site, pressurizing an operational fluid surrounding the capacitor, in particular to the target pressure, and performing a normal operation of the capacitor. These steps may in particular be performed after manufacturing (and healing) the capacitor, in order to set the capacitor up at an application side. Also the additional steps may be performed without impairing the structural and/or functional integrity of the capacitor, since the capacitor is still supported by the method by applying the pressure on the first side and the pressure on the second side of the capacitor.

It should be understood that features individually or in any combination disclosed, described, provided or employed for a method of supporting a capacitor may also be applied individually or in any combination to an arrangement for supporting a capacitor according to an embodiment of the present invention and vice versa.

According to an embodiment of the present invention, it is provided an arrangement for supporting a capacitor, the arrangement comprising a vessel, a frame arrangeable in the vessel and adapted to apply a pressure on a first side of the capacitor parallel to a first electrode of the capacitor in a first direction of a normal of the first electrode and to apply a pressure on a second side of the capacitor parallel to a second electrode of the capacitor in a second direction of a normal of the second electrode, wherein the first direction is opposite to the second direction and a pressurizing system adapted to pressurize a non-conductive fluid surrounding the capacitor within the vessel to a target pressure being above an atmospheric air pressure. The vessel may be cylindrically shaped, in particular comprising metal walls. The frame may comprise several components such as bars, plates, screws and springs in order to hold or support the capacitor.

In particular, the frame may comprise at least two parallel stiff plates (having a plane surface) between which the capacitor may be placed and which stiff plates may apply the pressure on the first side and the second side, respectively. The pressurizing system may comprise one or more compressors in communication with the non-conductive fluid (a fluid that is electrically insulating, in particular dielectric fluid). Thereby, the pressurizing system may be located outside the vessel. The frame for supporting the capacitor may hold or support the capacitor the whole lifetime of the capacitor. I.e., after manufacturing the capacitor and supporting the capacitor according to embodiments of the present invention (in particular using the frame), the capacitor may not be released from the frame anymore for its whole lifetime.

According to an embodiment of the present invention, the frame comprises at least one stiff plane plate in contact with a respective first and/or second side of the capacitor to apply the pressure on the respective side across a full area of the respective side. When the pressure is applied on substantially a full area of the respective side of the capacitor, the shape of the layers of dielectric material covered with metal may be maintained to be plane, thus maintaining the structural and functional integrity of the capacitor.

According to an embodiment of the present invention, the frame further comprises at least one spring, which generates the pressure on the first side and/or the pressure on the second side.

The at least one spring may comprise one, two, three, four, five, six or seven to twenty springs, in particular in order to control a force which is applied on the first side and the second side, in order to generate a desired (directed) pressure. In other embodiments, other means may be employed in order to generate a controllable force or pressure on the first side and the second side.

A further embodiment of the invention provides a capacitor assembly comprising a capacitor and a frame, wherein the frame is adapted to apply a pressure on a first side of the capacitor parallel to a first electrode of the capacitor in a first direction of a normal of the first electrode and to apply a pressure on a second side of the capacitor parallel to a second electrode of the capacitor in a second direction of a normal of the second electrode, wherein the first direction is opposite to the second direction. The frame may be configured in accordance with any of the embodiments described above or hereinafter. Furthermore, the capacitor may be supported in accordance with the above disclosed method in any of the described embodiments. The capacitor can furthermore be configured in accordance with any of the configurations described herein. Different physical means (e.g. spring(s), screw(s), bolt(s), bar(s), plate(s), motor) can be provided to configure the frame such that it is adapted to apply a pressure on the sides of the capacitor. In an embodiment, the frame of the capacitor assembly may comprise a first plate for applying the pressure to the first side of the capacitor and a second plate for applying the pressure to the second side of the capacitor, wherein the first plate and the second plate are connected by a guide element, in particular guide rods. One of the first and second plates may be a movable plate which is movable along the guide element, wherein the frame may further comprise a spring element applying a spring force to the first or second plate to urge the first and second plates together. The spring element may in particular apply a force to the movable plate. The spring may at its other side be mechanically connected to the guide element so as to apply the spring force to the guide element, either directly or indirectly, e.g. via a further plate. The spring element may for example push the movable plate and the further plate apart, the further plate being fixed to the guide element, or the spring element may directly be supported against the guide element (e.g. to a nut fastened thereto), thus pushing the movable plate away from its support at the guide element.

In the capacitor assembly according the spring element may comprise at least one leaf spring and/or at least one (in particular four) coil spring arranged to press the first plate and the second plate together.

A further embodiment of the invention provides a vessel enclosed capacitor assembly comprising a vessel filled with non-conductive fluid and enclosing a capacitor assembly according to one the embodiments described above. Thereby, the non-conductive fluid surrounds the capacitor within the vessel and is pressurized to a target pressure, in particular being above an atmospheric air pressure.

The vessel may be pressure compensatable, i.e. adapted to equalize an inside pressure within the vessel with an outside pressure external to the vessel. Pressure compensation may by employed during a subsea operation.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document. A further embodiment of the invention provides a subsea adjustable speed drive comprising a frequency converter having a direct current (DC) link, and further comprising a vessel enclosed capacitor assembly according to any of the above described embodiments, the capacitor of the vessel enclosed capacitor assembly being coupled to the direct current link of the frequency converter.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustration in the drawings is in schematic form. The arrangement 100 in FIG. 1 comprises a vessel 101 containing a non-conductive fluid 103 which surrounds a capacitor 105 which is in the illustrated embodiment a self-healing film capacitor. The arrangement 100 further comprises a voltage source 107 which is adapted to generate a voltage V be-tween terminals 109 and 111 and to apply the voltage (via connectors 110) to a first and a second electrode 115 of the capacitor 105, thereby charging the capacitor 105. The arrangement 100 further comprises a pressurizing system 117 which is connected via a port 119 to the interior of the vessel 101 in order to pressurize the non-conductive fluid 103 filled into the vessel 101 from a start pressure pi (e.g. when the interior of the vessel 101 is in communication with the air (pressure) 104 outside the vessel) to a target pressure p2.

The capacitor 105 comprises stacked dielectric layers 121 on which metal layers 123 are deposited. Thereby, the metal layers 123 are alternately connected either to a left conductor 122 to which the first electrode 113 is connected or to a right conductor 126 to which the second electrode 115 is connected. Thus, starting from the upper most layer 123 every other metal layer 123 is connected to the first electrode 113, but the metal layers in between two of the metal layers connected to electrode 113 are not connected to electrode 113. Conversely, starting from the second upper most layer 123 every other metal layer 123 is connected to the second electrode 115, but the metal layers in between two of the metal layers connected to electrode 115 are not connected to electrode 115.

During a method for treating the capacitor 105, the arrangement 100 applies a voltage V between the two electrodes 113, 115 of the capacitor to charge the capacitor at a start pressure pi. Thereby defect or faults 124 may be cleared or removed or reduced. Further on, using the pressurizing system 117, the non-conductive fluid 103 is pressurized, i.e. the pressure of the non-conductive fluid 103 is increased (e.g. to a pressure greater than or 2 to 500 times an atmospheric air pressure), while the fluid 103 surrounds the capacitor, to reach a target pressure p2, while the voltage V is being applied between the two electrodes 113, 115. Further defects or faults 124 may be cleared or removed or reduced at this increased pressure. Thereby, the pressurizing system 117 may continuously increase the pressure of the non-conductive fluid 103 within the vessel 101, causing continuously healing even further faults 124.

The vessel 101 comprises metal walls 125 having a cylindrical shape and which are closed by a cap 127 using screws 129. The vessel 101 may be a pressure test vessel an may be adapted to be capable of supporting an internal pressure of at least 300 bar, preferably at least 400 bar, which corresponds to a ambient water pressure at a depth of around 3,000 m or 4,000 m below sea level.

The capacitor 105 is mounted in a frame 131 comprising a fixed stiff plate 133 and a fixed stiff plane plate 135 as well as a guide element in form of the connecting bars 137, and further a movable stiff plane plate 139 which presses against the upper side of the capacitor 105. Furthermore, the fixed plate 135 (a not indicated insulating layer between 135 and 113 electrically disconnects the electrode 113 from the spring 141) supports the bottom side of the capacitor. Springs 141 are placed between the fixed stiff plate 133 and the movable plate 139 (a not indicated insulating layer between 139 and 115 electrically disconnects the electrode 115 from the plate 139) to apply a spring force in opposite directions between the movable plate 139 and the fixed plate 135 in order to compress the stack of dielectric films and metal layers 121, 123. The frame 131 thereby mounts the capacitor 105 such that delamination or evolvement of wrinkles is reduced or even prohibited or avoided. The capacitor 105 and the frame 131 form a capacitor assembly. After treating the capacitor inside the vessel 101, e.g. by a self-healing method, the capacitor assembly may be placed in a pressure compensated enclosure for subsea deployment.

In a particular embodiment, the capacitor assembly may be part of a power cell of a subsea adjustable speed drive (ASD). An adjustable speed drive is a frequency converter which converts AC power having an input frequency to AC power with of adjustable frequency for operating AC electric motors at adjustable speed. Such frequency converter can have an architecture using power cells, and each power cell can comprise a DC-link to which the capacitor of the capacitor assembly is coupled. The whole power cell including the capacitor assembly may be placed inside the vessel 101 for testing purposes and/or for performing a self-healing method for the capacitor 105 (during which a target pressure in form of a test pressure or self-healing pressure is applied). The power cell may then be mounted in a pressure compensated enclosure of the ASD for subsea deployment. The enclosure may comprise a pressure compensator for performing a pressure balancing between pressure inside the enclosure and ambient (subsea) pressure, and the enclosure may be filled with a dielectric liquid. The enclosure may then be deployed at a subsea location, wherein due to the pressure balancing, a target pressure (in form of the ambient subsea pressure) is applied to the power cell and thus to the capacitor 105 of the capacitor assembly. The arrangement 200 illustrated in FIG. 2 for supporting a capacitor 201 comprises a frame 203 which is arrangeable in a not illustrated vessel (such as vessel 101 illustrated in FIG. 1) and is adapted to apply a pressure (or force) 205 on a first side 207 of the capacitor 201 parallel to a first electrode (or internal metal layer) 209 of the capacitor 201 in a first direction 205 of a normal 211 of the first electrode 209 and is adapted to apply a pressure 213 on a second side 215 of the capacitor 201 parallel to a second electrode (or internal metal layer) 217 in a second direction 213 of a normal 219 of the second electrode 217.

Thereby, the frame 203 comprises a first stiff plate 221 and a second stiff plate 223 which are connected rigidly with each other by two bars 225. The first rigid plate 221 and the second rigid plate 223 are plane plates or plates having a plane surface which are parallel to each other. The frame 203 further comprises a rigid plane 227 which is movable in the directions 229 (parallel to the bars 225 and perpendicular to a main surface area of the movable plate 227). Between the fixed and rigid plate 223 and the movable plate 227, the capacitor 201 is arranged.

Figure 2:
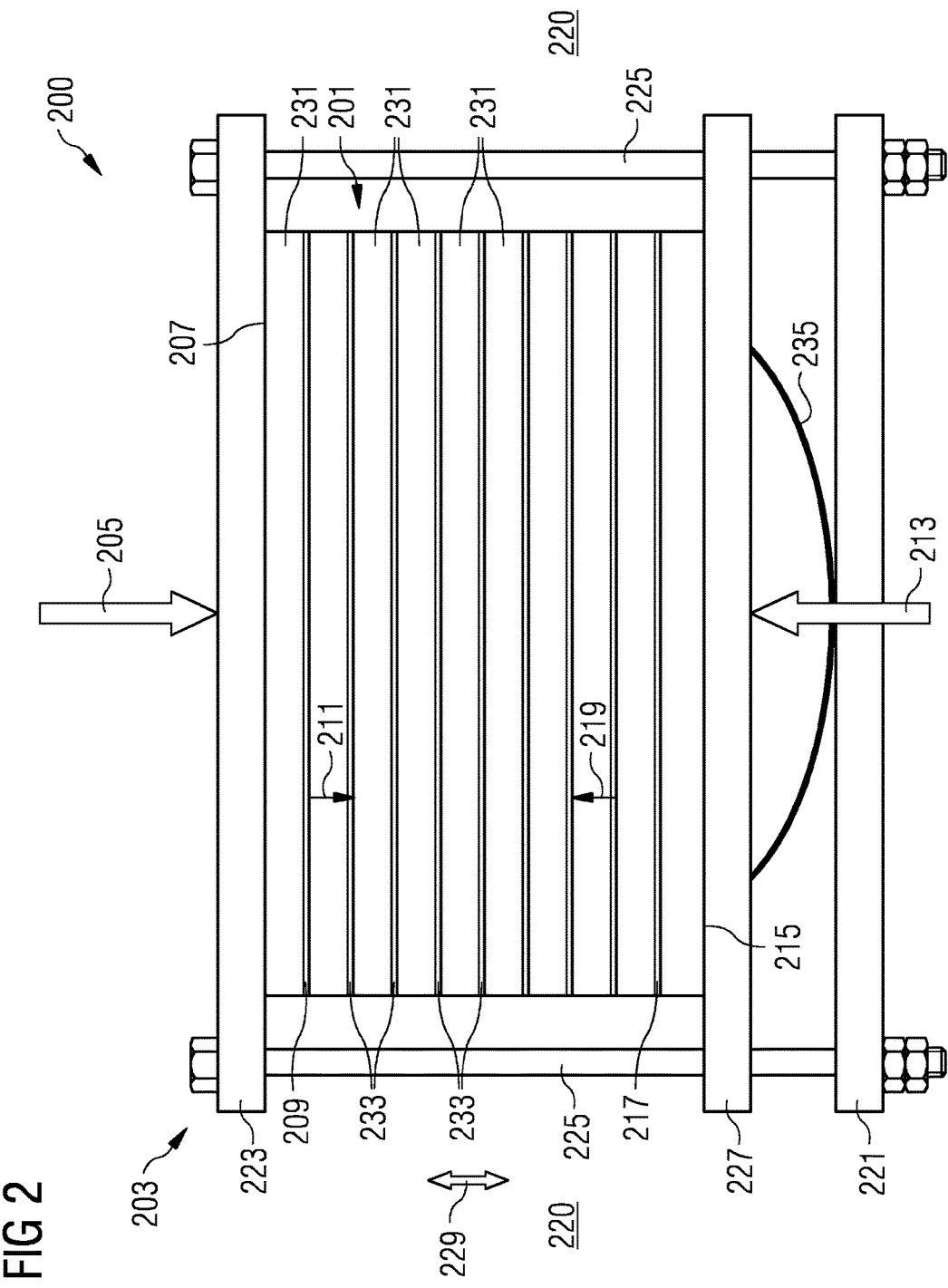
FIG. 2 schematically illustrates a side view of an arrangement for supporting a capacitor according to an embodiment of the present invention.

As is apparent in FIG. 2, the capacitor comprises dielectric material 231 in layers with interposing metal layers 233 forming the electrodes of the capacitor, wherein connectivities of the metal layer may be as in the capacitor illustrated in FIG. 1. The frame further comprises a spring element 235 which is arranged between the fixed plate 221 and the movable plate 227 in order to generate the pressure 213 and 205, thus, the spring element 235 generates a force in the upward direction in FIG. 2. Thereby, a pressure is applied on the first side 207 and the second side 215 of the capacitor, in order to press the dielectric layers and electrodes or metal layers 233 firmly together with a defined force which is defined by the spring characteristics, such that no fluid can penetrate or expand into the interior of the capacitor 201.

The spring element 235 is in the illustrated example configured as a bent metal band. In other embodiments, the spring element 235 may comprise one or more spiral springs or helical or coil springs. A number of coil springs may for example be arranged between the fixed plate 221 and the movable plate 227 with the spring axis being oriented perpendicular to a main surface of the plates 221, 227. Fluid 220 (in particular in a not illustrated vessel) may surround the frame supporting the capacitor and may be pressurized.

The capacitor assembly including the capacitor 201 and the frame 203 as illustrated in FIG. 2 may be placed in the vessel illustrated in FIG. 1 for performing a self-healing method which decreases the risk of capacitor failure, as described above. Furthermore, in particular after the application of such method, the capacitor assembly (including the frame) may be placed in a pressure compensated enclosure, which is pressure balanced against an ambient medium, such as sea water. This enclosure may then be deployed to a subsea location.

Figure 3:
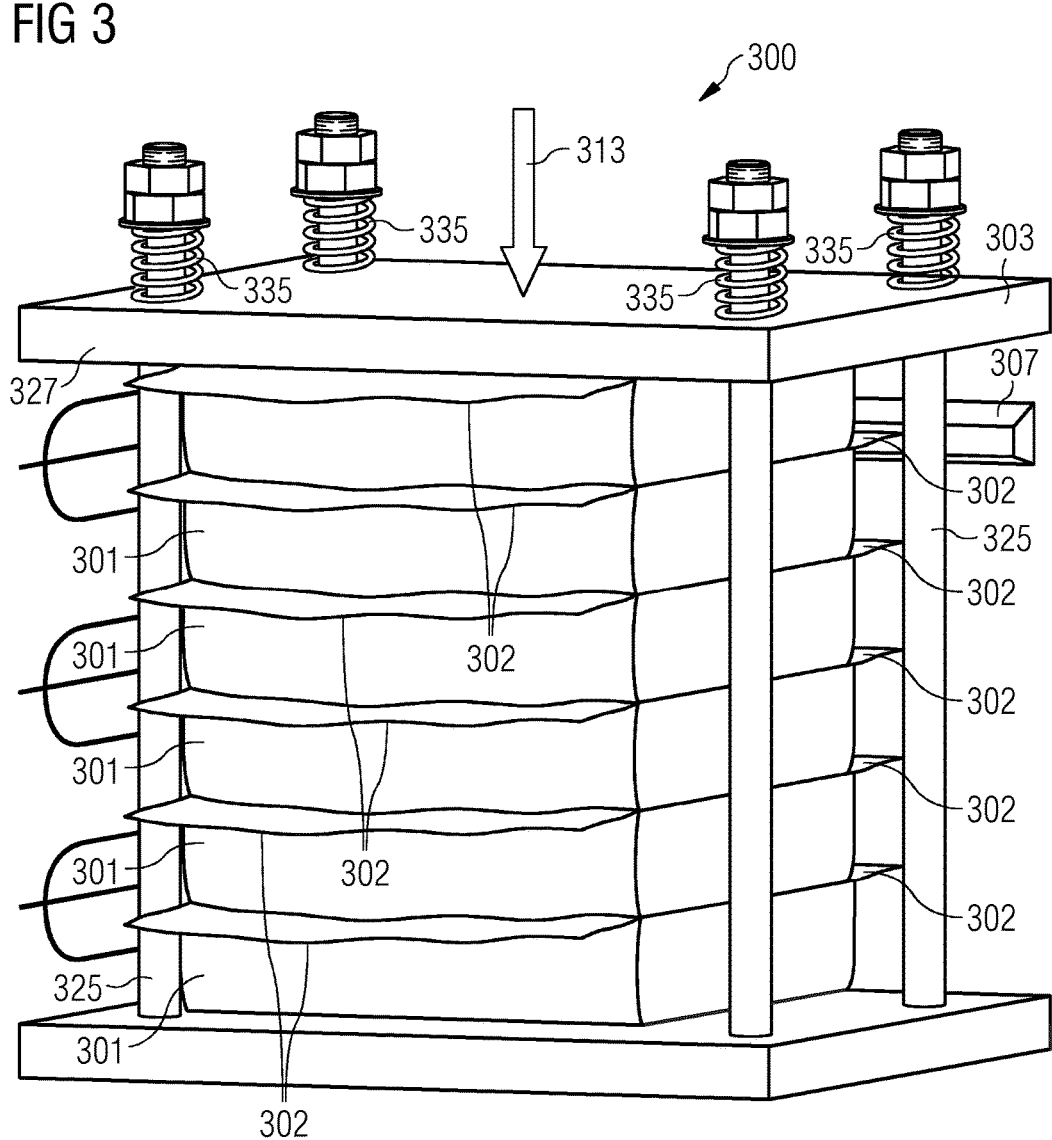
FIG. 3 illustrates a schematic perspective view of another embodiment of an arrangement for supporting a capacitor according to an embodiment of the present invention.

Accordingly, the ambient subsea pressure may then be applied to the capacitor inside the pressure compensated enclosure. FIG. 3 illustrates another arrangement 300 for supporting a capacitor, wherein in the illustrated example, five capacitors 301 are supported by a frame 303. The capacitors 301 and the frame 303 form a capacitor assembly. There are insulating layers 302 between the capacitors 301, and also between capacitors 301 and frame 303. FIG. 3 illustrates a fixed plate 321 and a movable plate 327 on which a pressure 313 is generated using a number (in particular four) coil springs 335 which are screwed to bars 325. The frame together with the supported capacitors 301 may be placed within a vessel (containing a fluid) and then pressurized.

Figure 4:
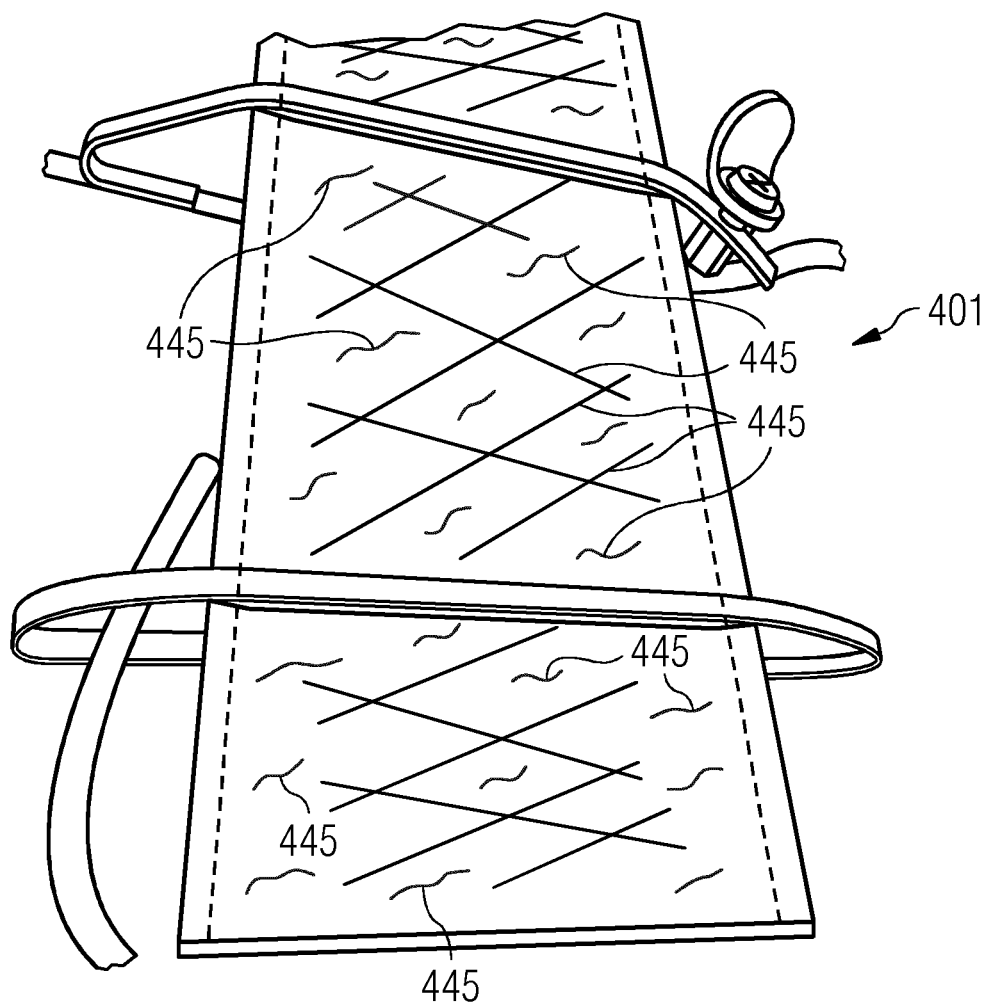
FIG. 4 illustrates a capacitor when not treated according to a method for supporting a capacitor according to an embodiment of the present invention.

FIG. 4 illustrates a capacitor 401 which is not supported according to methods and arrangements according to an embodiment of the present invention but which is freely mounted (no spring force is applied). When a capacitor freely mounted is pressurized (oil pressure is increased), each internal voids and air pockets are filled with compressed fluids. This process may be accelerated when the fluid is hot due to its lower viscosity. When the fluid is decompressed or the fluid temperature changes, it expands and creates pockets 445 of fluid inside the capacitor 401 that forces the dielectric layers apart and causes delamination and wrinkles, and causes the self-healing mechanism to not function. When the fluid is present in between layers, the layers may slide relative to each other more easily and wrinkles may form, as is apparent from the not plane structure of the outer layer of the capacitor 401 illustrated in FIG. 4.

According to embodiments of the present invention, delamination and forming of wrinkles is prevented by the compressive spring force distributed over the capacitor surface, thus keeping the dielectric layers in place (in position and orientation) by using a mechanical force. Thereby, it is beneficial to apply the spring force (or any other generated force) for film capacitors that are to be used in pressurized oil environments or in subsea applications where they are surrounded by pressurized medium or fluid.

Capacitors may be manufactured for example according to the following procedure.

Dielectric layers and metal layers may be stacked in air, a spring force may be applied on the first side and the second side of the capacitor, the capacitor may be put into a vessel in order to carry out a self-healing procedure in which first a voltage is applied to electrodes of the capacitor and then the pressure within the vessel is gradually increased. Afterwards, the vessel may be depressurized and the capacitor or capacitors may be taken out, while the spring force is being maintained.

Such assembly including the capacitor and the frame may be may be utilized in a power cell, in particular a DC-link of a power cell of a subsea adjustable frequency drive (AFD).

Note that the features of the embodiments described above and in particular with respect to the figures can be combined to form new embodiments.

It should be noted that the term "comprising" does not exclude other elements or steps and "a" or "an" does not ex-elude a plurality. Also elements described in association with different embodiments may be combined. It should also noted that reference signs in the claims should not be construed as limiting the scope of the claims.

The invention claimed is:

1. A method for supporting a capacitor, the method comprising:
    applying a pressure on a first side of the capacitor, parallel to a first electrode of the capacitor in a first direction of a normal of the first electrode;
    applying a pressure on a second side of the capacitor, parallel to a second electrode of the capacitor in a second direction of a normal of the second electrode, wherein the first direction is opposite to the second direction;
    applying a voltage between the first electrode of the capacitor and the second electrode of the capacitor, to charge the capacitor at a start pressure of non-conductive fluid surrounding the capacitor; and
    subsequently pressurizing the non-conductive fluid surrounding the capacitor to a target pressure, the target pressure being above an atmospheric air pressure.

2. The method of claim 1, wherein the target pressure of the non-conductive fluid is between 10 bar and 500 bar.

3. The method of claim 2, wherein the target pressure of the non-conductive fluid is between 250 bar and 350 bar.

4. The method of claim 1, wherein a temperature of the non-conductive fluid is between −20° C. and 100° C.

5. The method of claim 4, wherein the temperature is a temperature of the non-conductive fluid, and wherein the temperature is between 30° C. and 90° C.

6. The method of claim 1, wherein the capacitor is a film capacitor comprising a stack of dielectric layers or a roll of dielectric layers, formed from two films, each of the two films being coated with a conductor, and wherein a metal, on one side of each of the two films, forms at least one of the first electrode of the capacitor and the second electrode of the capacitor.

7. The method of claim 6, wherein the films include a thickness between 1 μm and 20 μm, the films comprising propylene, and wherein on each film, the metal comprises aluminum.

8. The method of claim 1, wherein the pressure applied on at least one of the first side and the second side is selected such that no non-conductive fluid penetrates between dielectric layers of the capacitor or causes wrinkles or delamination in the dielectric layers of the capacitor when the non-conductive fluid surrounding the capacitor is pressurized to the target pressure.

9. The method of claim 8, wherein the pressure from ambient static fluid pressure combined with the pressure from the method of supporting the capacitor does not exceed a critical total pressure to maintain a self-healing function.

10. The method of claim 1, wherein the pressure applied on at least one of the first side and the second side of the capacitor is between 0.1 bar and 50 bar.

11. The method of claim 10, wherein the pressure applied is between 1 bar and 10 bar.

12. The method of claim 1, wherein the non-conductive fluid comprises a dielectric liquid.

13. The method of claim 12, wherein the non-conductive fluid comprises an ester-based dielectric liquid.

14. The method of claim 1, wherein during the pressurizing, the pressure of the non-conductive fluid increases at a rate of between 1 and 10,000 bar per minute.

15. The method of claim 14, wherein during the pressurizing, the pressure of the non-conductive fluid increases at a rate of 50 and 200 bar per minute.

16. The method of claim 1, wherein the voltage has a value between 0.5 and 1.5 of a rated voltage of the capacitor.

17. The method of claim 16, wherein the voltage has a value between 300 V and 1500 V, wherein further, after applying the voltage an electric field between the first electrode of the capacitor and the second electrode of the capacitor has a value between 20 and 500 V/ μm.

18. A method for supporting a capacitor, the method comprising:
    applying a pressure on a first side of the capacitor, parallel to a first electrode of the capacitor in a first direction of a normal of the first electrode;
    applying a pressure on a second side of the capacitor, parallel to a second electrode of the capacitor in a second direction of a normal of the second electrode, wherein the first direction is opposite to the second direction;
    subsequently pressurizing a non-conductive fluid surrounding the capacitor to a target pressure, the target pressure being above an atmospheric air pressure;
    depressurizing the non-conductive fluid to a start pressure;
    transporting the capacitor to an application site;
    pressurizing an operational fluid surrounding the capacitor; and
    performing a normal operation of the capacitor.

19. An arrangement for supporting a capacitor, the arrangement comprising:
    a vessel;
    a frame, arrangeable in the vessel and adapted to apply a pressure on a first side of the capacitor, parallel to a first electrode of the capacitor in a first direction of a normal of the first electrode and adapted to apply a pressure on a second side of the capacitor, parallel to a second electrode of the capacitor in a second direction of a normal of the second electrode, wherein the first direction is opposite to the second direction;
    means for applying a voltage between the first electrode of the capacitor and the second electrode of the capacitor, to charge the capacitor at a start pressure of non-conductive fluid surrounding the capacitor within the vessel; and
    means for subsequently pressurizing the non-conductive fluid surrounding the capacitor within the vessel to a target pressure, the target pressure being above an atmospheric air pressure.

20. The arrangement of claim 19, wherein the frame comprises at least one stiff plane plate in contact with at least one of a respective first and second side of the capacitor to apply the pressure on the respective side across a full area of the respective side.

21. The arrangement of claim 20, wherein the vessel is pressure compensatable.

22. The arrangement of claim 19, the frame further comprising:
    at least one spring, to generate at least one of the pressure on the first side and the pressure on the second side.

23. The arrangement of claim 19, wherein in the pressurizing system, adapted to subsequently pressurize a non-conductive fluid surrounding the capacitor within the vessel to a target pressure, the pressure of the non-conductive fluid increases at a rate of between 1 and 10,000 bar per minute.

24. The arrangement of claim 19, wherein the voltage has a value between 0.5 and 1.5 of a rated voltage of the capacitor.

25. A vessel enclosed capacitor assembly, comprising
a vessel, filled with non-conductive fluid and enclosing a capacitor assembly, the capacitor assembly including a capacitor,
a frame, the frame being adapted
to apply a pressure on a first side of the capacitor, parallel to a first electrode of the capacitor in a first direction of a normal of the first electrode, and
to apply a pressure on a second side of the capacitor, parallel to a second electrode of the capacitor in a second direction of a normal of the second electrode, wherein the first direction is opposite to the second direction,
means for applying a voltage between the first electrode of the capacitor and the second electrode of the capacitor, to charge the capacitor at a start pressure of the non-conductive fluid surrounding the capacitor, and
means for subsequently pressurizing the non-conductive fluid surrounding the capacitor within the vessel to a target pressure, the target pressure being above an atmospheric air pressure.

26. The capacitor assembly of claim 25, wherein the frame comprises a first plate to apply the pressure to the first side of the capacitor and a second plate to apply the pressure to the second side of the capacitor, wherein the first plate and the second plate are connected by a guide element, wherein one of the first and second plates is a movable plate movable along the guide element, and wherein the frame further includes a spring element to apply a spring force to the first or second plate to urge the first and second plates together.

27. The capacitor assembly of claim 26, wherein the spring element comprises at least one of at least one leaf spring and at least one coil spring.

28. The capacitor assembly of claim 26, wherein the spring element comprises at least one of at least one leaf spring and at least one coil spring.

29. A subsea adjustable speed drive, comprising:
a frequency converter including a direct current link; and
the vessel enclosed capacitor assembly of claim 25, the capacitor of the vessel enclosed capacitor assembly being coupled to the direct current link of the frequency converter, wherein the vessel is pressure compensatable.

* * * * *